(12) United States Patent
Varailhon et al.

(10) Patent No.: US 6,666,300 B2
(45) Date of Patent: Dec. 23, 2003

(54) DEVICE FOR LUBRICATING A STEP-UP/DOWN MECHANICAL ASSEMBLY

(75) Inventors: Christian Varailhon, Saint Chamas (FR); Lionel Pierre Jean Auricombe, Rue Achille Emperaire (FR)

(73) Assignee: Eurocopter, Cedex (FR)

(*) Notice: Subject to any disclaimer, the term of this patent is extended or adjusted under 35 U.S.C. 154(b) by 0 days.

(21) Appl. No.: 10/206,598

(22) Filed: Jul. 29, 2002

(65) Prior Publication Data

US 2002/0175026 A1 Nov. 28, 2002

Related U.S. Application Data

(62) Division of application No. 09/616,626, filed on Jul. 26, 2000, now Pat. No. 6,446,755.

(30) Foreign Application Priority Data

Sep. 10, 1999 (FR) .............................. 99 11359

(51) Int. Cl.[7] ................................. F16N 7/36
(52) U.S. Cl. .................. 184/6.12; 184/11.2; 184/43; 210/168
(58) Field of Search ................ 184/11.1–11.4, 184/6.12, 43; 74/606 A; 210/168, 416.5, 380.1; 494/15

(56) References Cited

U.S. PATENT DOCUMENTS

| | | |
|---|---|---|
| 342,425 A | 5/1886 | Byrne et al. |
| 1,401,711 A | 12/1921 | Kralicek .................. 184/11.3 |
| 1,775,623 A | 9/1930 | Morgan |
| 2,754,693 A | 7/1956 | Tholl et al. ............... 184/11.1 |
| 2,980,209 A | 4/1961 | Rabson ..................... 184/11.1 |
| 3,065,822 A | 11/1962 | McAfee et al. ............... 184/6 |
| 3,502,177 A | 3/1970 | Christie .................... 184/11.1 |
| 3,529,698 A | 9/1970 | Nelson ..................... 184/11.2 |
| 3,635,311 A | 1/1972 | Kaufman .................. 184/11.2 |
| 4,249,783 A | 2/1981 | Glassmeyer .............. 184/11.2 |
| 5,772,573 A | 6/1998 | Hao ......................... 184/11.2 |
| 6,039,667 A | 3/2000 | Schunck et al. ........... 184/11.4 |

FOREIGN PATENT DOCUMENTS

| | | |
|---|---|---|
| FR | 1094563 | 5/1955 |
| FR | 2479946 | 10/1981 |
| FR | 2685758 | 7/1993 |
| GB | 0210501 | 1/1924 |

OTHER PUBLICATIONS

French Novelty Search Report, dated May 19, 2000.

*Primary Examiner*—Chong H. Kim
(74) *Attorney, Agent, or Firm*—Stevens, Davis, Miller & Mosher, LLP

(57) ABSTRACT

A device for lubricating a step-up/down mechanical assembly with a lubricating fluid has a collection reservoir, a circuit for distributing lubricating fluid, and a device for creating relative movement. The collection reservoir collects the lubricating fluid from the step-up/down mechanical assembly and is fixed to a structure of the step-up/down mechanical assembly. The circuit for distributing lubricating fluid has a scoop with a first end that enters the collection reservoir and rotates with respect to the structure. The relative movement device provides a relative movement between the first end of the scoop and the collection reservoir such that the scoop rotates about an axis of rotation relative to the structure. As a result of this movement, the lubricating fluid in the collection reservoir flows through the distribution circuit and is conveyed to an element of the step-up/down assembly that is to be lubricated.

9 Claims, 4 Drawing Sheets

DEVICE FOR LUBRICATING A STEP-UP/DOWN MECHANICAL ASSEMBLY

This application is a divisional of prior application Ser. No. 09/616,626 filed Jul. 26, 2000 now U.S. Pat. No. 6,446,755.

FIELD OF THE INVENTION

The present invention relates to a device for lubricating a step-up/down mechanical assembly, particularly a transmission gearbox, especially the main transmission gearbox of a helicopter.

DESCRIPTION OF RELATED ART

It is known that in step-up/down mechanical assemblies of this type, the oil or lubricating fluid fulfills two functions: on the one hand, it reduces friction at gears, bearings and joints and, on the other hand, it takes away power losses in the form of heat.

The first function, that of reducing the coefficients of friction, does not require a high oil flow rate, the essential thing being that a film of oil be maintained between the various contacting parts. By contrast, its importance to the correct operation of the mechanical assembly is fundamental; in the event of failure, the increase in the coefficients of friction leads to an increase in the heat energy, which may soon manifest itself as surface damage to the contacting parts.

The second function of the oil, which consists in transporting heat energy from the areas in which it is generated (gears, bearings, joints, etc.) to dissipation zones (radiators, walls of casings, etc.), for its part requires a higher oil flow rate.

As far as this second function in particular is concerned, devices arranged locally inside the step-up/down assembly and which are capable of fulfilling an acceptable backup role by causing local recirculation of a reserve of oil between hot and confined zones and cooler zones, such as the walls of casings, are known. In mechanical assemblies which transmit relatively low powers, these devices may even be enough to completely fulfill this second function.

The major benefit of backup devices is, however, that they provide an answer to the problem posed by the loss of lubrication of the moving parts of the step-up/down mechanical assembly in question Specifically, it is known that in the event of a loss of oil from the lubrication device, for example as a result of a leak in the lubrication circuit or from a seal, the increase in the coefficients of friction and the fact that the thermal energy is practically no longer removed, means that the temperatures of the various parts of the step-up/down assembly increase considerably. This in particular results in damage to the surfaces and degradations in the quality of the materials, which may lead to the destruction of parts such as bearings or teeth.

When said step-up/down assembly is a helicopter transmission gearbox, particularly the main transmission gearbox, the aforementioned consequences entail that, for safety reasons, when oil is lost from said transmission gearbox, the helicopter be set down quickly. This constraint may have very serious consequences when overflying certain zones, such as maritime zones, forests, urbanized zones or enemy territory (in the case of military applications), in which landing or ditching is difficult, or even impossible.

It will be noted that the survivability or operability of the helicopter is lower, the heavier the helicopter, because the powers transmitted by the transmission gearboxes increase out of proportion with their size. In particular, as far as most existing heavyweight helicopters are concerned, the operability following a total loss of lubrication is very low, or even non-existent.

Various backup or survival devices for transmission gearboxes, for the event of the malfunctioning of the transmission-gearbox lubricating system, are known.

In particular, the document FR-2 685 758 discloses a backup lubricating and cooling system for helicopter transmission gearboxes. This lubricating system comes into operation in the event of total failure of the existing lubricating circuit or circuits. For this purpose, this known system has an additional lubricating circuit which is independent of the existing circuit or circuits and which in particular comprises a reservoir, a supply line, pressurizing means or a pump, and a distribution circuit. This known system is therefore bulky, heavy and expensive.

Another source, document FR-1 094 563, discloses a lubricating device for a ball bearing. In this case, the lubricating fluid used for lubrication is accumulated in a rotary casing, which it leaves via a number of stationary tubes which are immersed via an open and elbowed end, in a layer of rotating oil centrifuged out to the periphery of the casing. The lubricating oil flows under the action of the centrifuging pressure.

However, the oil thus collected is simply returned to a specific oil reservoir of the lubricating device.

Furthermore, document FR-2 479 946 discloses a lubricating oil-return circuit for coupling mechanisms. For this purpose, the casing of such a mechanism is rotary and leads to an accumulation of oil in the form of an annular layer, and a collecting tube, the end of which is elbowed, is immersed in this annular layer to collect the oil.

This return circuit needs two pumps, namely a first pump which is mounted in series with the collecting tube, for conveying the fluid to a reservoir, and a second pump for removing the fluid and sending it to the elements that are to be lubricated.

SUMMARY OF THE INVENTION

The object of the present invention is to overcome these drawbacks. This invention relates to an effective and not-too-bulky device for lubricating a step-up/down mechanical assembly, which allows said mechanical assembly to continue to operate at least for a given length of time in the event of a leak of lubricating fluid and which, in the case of a helicopter transmission gearbox, allows said helicopter to continue to fly with a transmission of sufficient power for the longest possible determined length of time.

To this end, according to the invention, said device for lubricating a step-up/down mechanical assembly, particularly a transmission gearbox, said lubricating device comprising:

- a reservoir for collecting lubricating fluid from said step-up/down mechanical assembly;
- a circuit for distributing lubricating fluid;
- at least one scoop, a first end of which enters said collection reservoir; and
- means capable of creating a relative movement between at least said first end of the scoop and said collection reservoir, which causes lubricating fluid to be made to enter said scoop via said first end, is noteworthy in that said means create a relative movement which causes, in the lubricating fluid in said collection reservoir, a dynamic effect such that it causes said lubricating fluid to flow through said distribution circuit in such a way as to convey it to at least one element of said step-up/down mechanical assembly that is to be lubricated.

Thus, by virtue of the invention, lubrication is achieved by re-using the oil or lubricating fluid collected (by trickling) in said collection reservoir. In consequence, in the event of a leak or loss of some of the oil, lubrication can be continued using the collected remaining proportion of the oil, which allows said step-up/down mechanical assembly to continue to operate for a certain length of time yet after the incident which caused the loss of oil.

In particular, in the case of a helicopter transmission gearbox, this length of time may be such that it allows said helicopter to land in complete safety at a safe place. According to the invention, as will be seen in greater detail hereinbelow, in order to lengthen this period of operation in the event of an oil leak, the lubrication implemented by the device according to the invention performs the exclusive lubrication of one or more vital parts of said step-up/down assembly, such as the gears.

Furthermore, by virtue of the invention, the lubricating fluid is made to circulate in said distribution circuit by the dynamic effect or force produced by the relative movement of the collecting reservoir and said first end of the scoop. In consequence, the device according to the invention requires no pump or other known means for causing this circulation, thus making it possible to obtain a lightweight, non-bulky and inexpensive device.

Furthermore, the trickling of lubricating fluid along the walls of the step-up/down assembly, which walls are generally cooler than the moving parts of said assembly, allows the heat energy produced in this assembly to be removed, at least partially, and thus makes it possible to fulfill the second aforementioned function (the removal of heat) of the lubricating fluid.

It will be noted that unlike the means described in the aforementioned documents FR-1 094 563 and FR-2 479 946, the device according to the invention requires no auxiliary means, such as pumps for example, for performing lubrication, that it to say for conveying the lubricating fluid to the elements that are to be lubricated. This leads to numerous advantages, particularly as regards the cost and space requirement, which are lowered.

Of course, the device according to the invention can be used constantly as a complement, in addition to a customary main lubricating circuit, or simply as a backup device for such a main lubricating circuit in the event of failure of the latter.

However, it is also conceivable for the device according to the invention to be used alone, as the main lubricating circuit, on step-up/down mechanical assemblies whose size and transmitted power do not require high flow rates of lubricating fluid.

Advantageously, said relative movement is a rotary movement about an axis of rotation and said first end of the scoop has an elbow, the free end of which is located in a plane roughly orthogonal to said axis of rotation. Instead of being elbowed, said first end may also be simply inclined.

In a first simplified alternative form, said free end of the elbow is roughly straight, whereas, in a second alternative form, said free end of the elbow is roughly in the shape of an arc of a circle, the center of which roughly corresponds to said axis of rotation, which makes it easier for fluid to enter the scoop and circulate in said distribution circuit.

In a first embodiment, said scoop is fixed to a structure of said step-up/down mechanical assembly and said collection reservoir is mounted so that it can rotate with respect to said structure, and said means for creating a relative movement comprise means for causing said collection reservoir to rotate.

Furthermore, in a second embodiment, said collection reservoir is fixed to a structure of said step-up/down mechanical assembly, at least said first end of the scoop is mounted in such a way that it can rotate with respect to said structure, and said means for creating a relative movement comprise means for causing at least said first end of the scoop to rotate.

The aforementioned rotary movement, regardless of the embodiment considered, subjects the lubricating fluid from the collection reservoir to, on the one hand, a rotary movement and, on the other hand, a centrifugal force which together generate the dynamic effect that causes some of said lubricating fluid to circulate into said scoop. This dynamic effect makes it possible to overcome the pressure drops in the distribution circuit and ensure a sufficient flow rate of lubricating fluid.

Furthermore and advantageously, the device according to the invention comprises means, for example fins or cavities, located in said reservoir and capable of reducing the turbulence of said lubricating fluid, which turbulence is generated by said relative movement, which makes it possible to encourage the lubricating fluid to circulate in said scoop and also provides for better effectiveness of the device according to the invention.

A second end of the scoop (or other ends of the scoop), said scoop preferably being produced in the form of a metal pipe, which is the opposite end to said first end opening into the reservoir, may be produced and arranged in various ways. In particular:

it may be arranged directly facing the element that is to be lubricated, for example being equipped with a nozzle for this purpose. Spraying may then be obtained simply by virtue of the dynamic effect (or force) caused on the lubricating fluid by the aforementioned relative movement; and/or it may open into an auxiliary reservoir intended to receive the lubricating fluid.

In a first alternative form, said auxiliary reservoir is situated in such a way as to cause said lubricating fluid to reach said element that is to be lubricated under the effect of gravity.

Thus, some of the collected, lubricating fluid can be kept in said auxiliary reservoir, particularly for a later use, for example in the event of a loss of lubricating fluid.

In a second alternative form, said auxiliary reservoir is rotated in such a way as to cause the lubricating fluid to reach the element that is to be lubricated through a centrifugal effect.

The present invention also relates to a system for lubricating a step-up/down mechanical assembly, particularly a transmission gearbox, said lubricating system comprising a customary main lubricating circuit.

According to the invention, this lubricating system is noteworthy in that it additionally comprises a lubricating device such as the aforementioned one and in that this lubricating device is arranged in such a way as to lubricate exclusively at least one vital part (gear, bearing, etc.) of said step-up/down mechanical assembly.

In the context of the present invention, the expression "vital part" is to be understood as meaning a part of the step-up/down assembly which has to be lubricated in order to be able to continue to fulfill its functions or, more specifically, the unlubricated running time of which is very short. As a preference, the lubricating device is intended to lubricate a certain number of parts of said step-up/down assembly, the respective unlubricated running times of which are the shortest.

Thus, by virtue of the addition of said lubricating device, the lubricating system according to the invention can continue to lubricate the vital part or parts of the step-up/down mechanical assembly in the event of the failure of the main lubricating circuit, which makes it possible to lengthen the running time of said mechanical assembly in such a situation.

BRIEF DESCRIPTION OF THE DRAWINGS

The figures of the appended drawing will make it easier to understand how the invention may be achieved. In these figures, identical references denote similar elements.

DETAILED DESCRIPTION OF THE INVENTION

Figure 1:
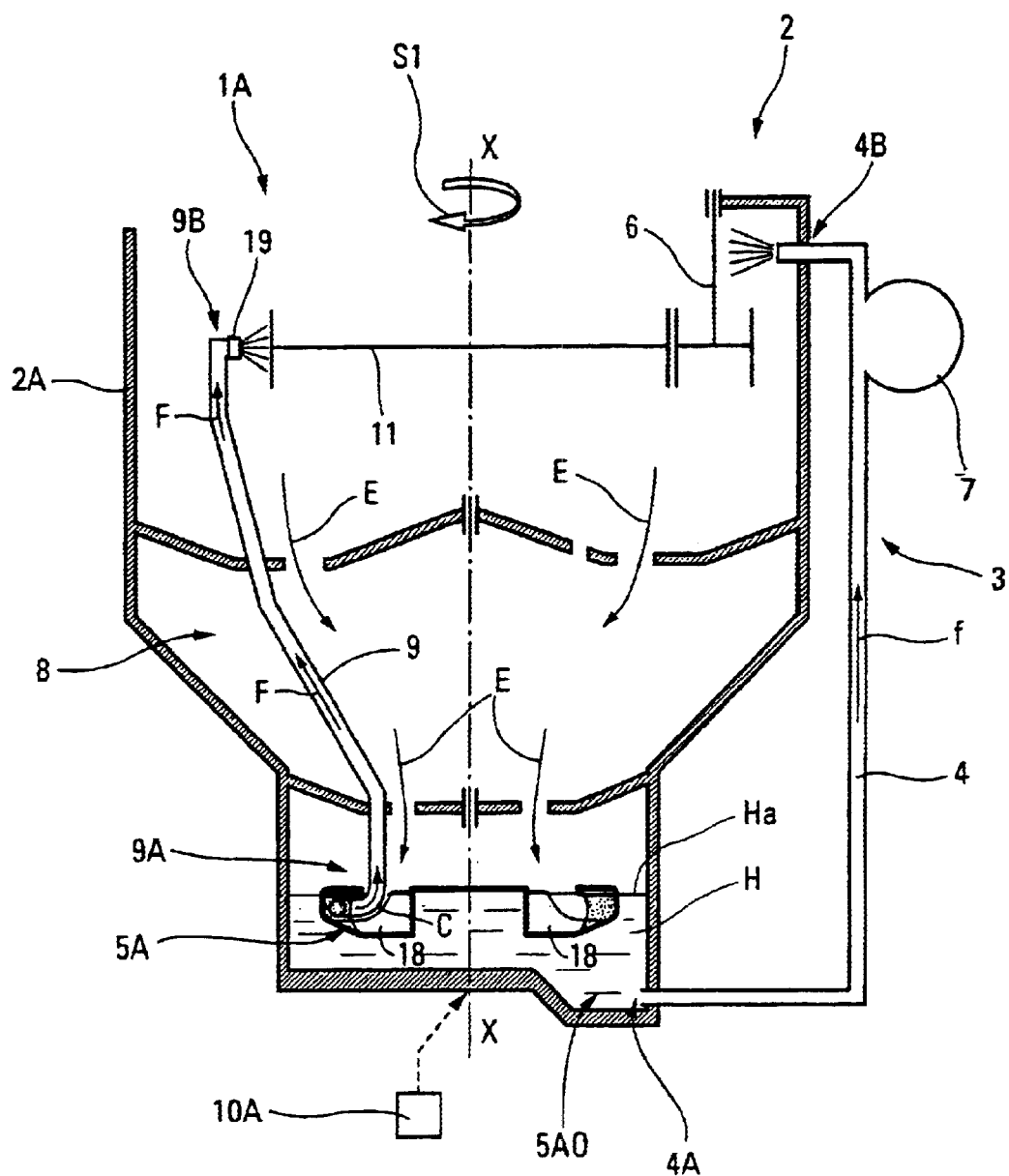
FIGS. 1, 4 and 5 diagrammatically illustrate a device according to the invention, respectively in different embodiments.
Figure 4:
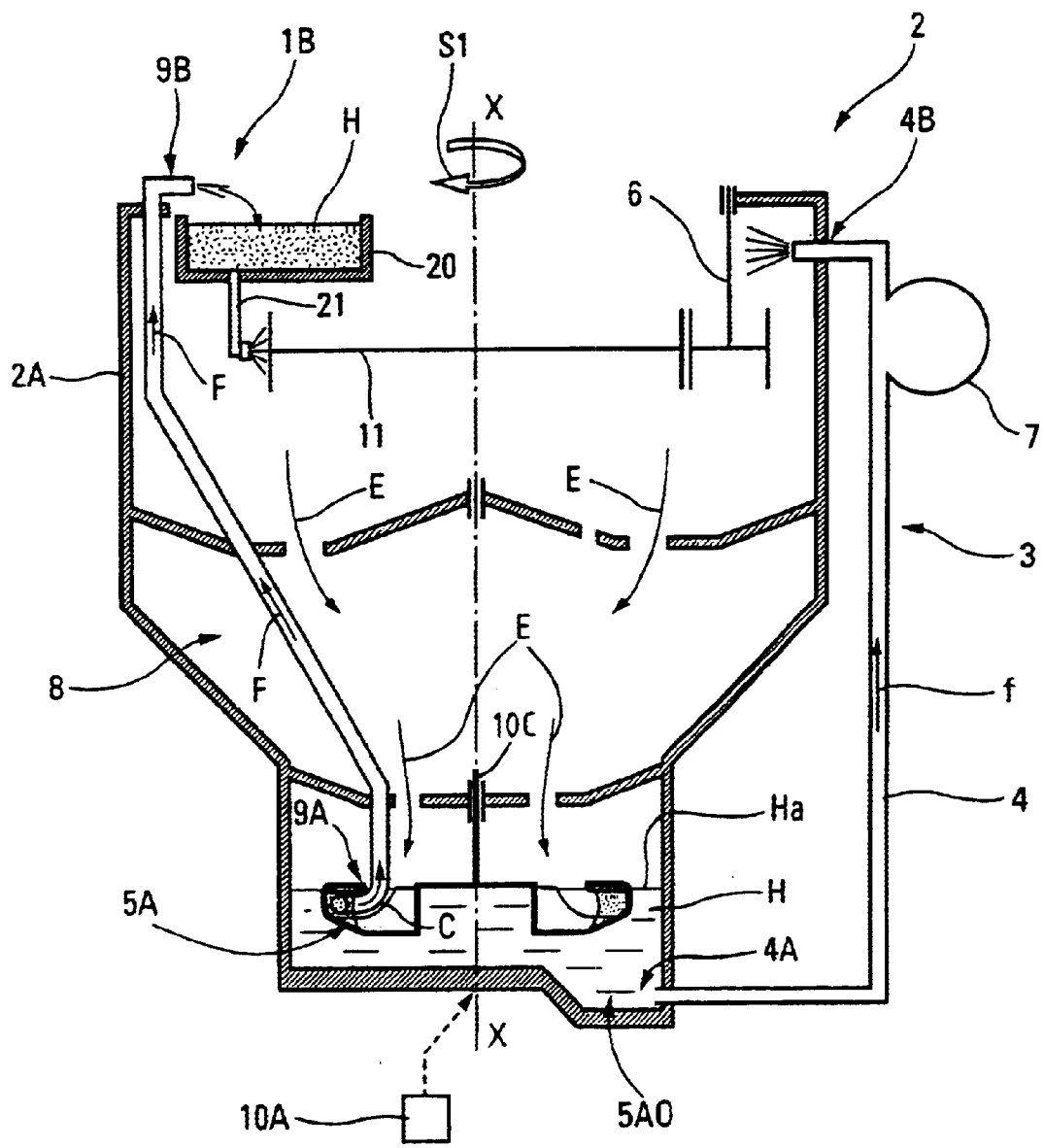
Figure 5:
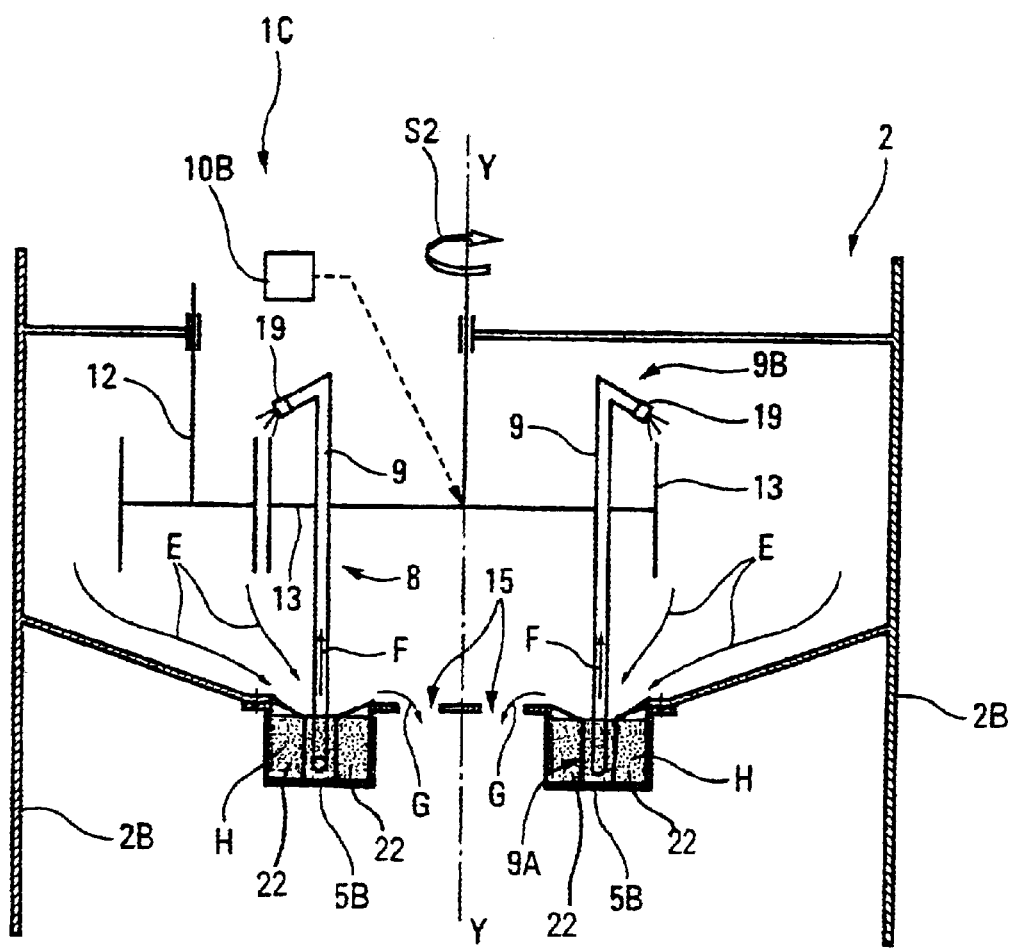

The lubricating device according to the invention and depicted diagrammatically in various embodiments 1A, 1B and 1C in FIGS. 1, 4 and 5 respectively, is intended to lubricate a step-up/down mechanical assembly 2 depicted partially and schematically, particularly a transmission gearbox and especially the main transmission gearbox of a helicopter.

In a first embodiment, said lubricating device may alone lubricate the step-up/down assembly 2, particularly when said assembly 2 does not require high flow rates of lubricating fluid.

By contrast, in another embodiment, as depicted in FIGS. 1, 4 and 5, said device 1A, 1B, 1C is used in addition to a main lubricating circuit 3 for said assembly 2 and forms, together with this main lubricating circuit 3, a lubricating system according to the invention.

As is known (please refer, for example, to document FR-2 685 758), this main lubricating circuit 3 generally comprises:

a circuit or simply a link 4 for distributing lubricating fluid H. One 4A of the ends 4A, 4B of said link 4 enters the bottom 5AO of a reservoir 5A of lubricating fluid H for lubricating the assembly 2, and the other end 4B is positioned facing an element 6 (gear, bearing, etc.) of said assembly 2 that is to be lubricated; and means 7, for example a pump, for causing the lubricating fluid to circulate in said lubricating link 4, as illustrated by an arrow f, and possibly other known means not depicted, such as radiators and/or filters.

The device 1A, 1B, 1C according to the invention, which, in the known way, comprises a distribution circuit 8 and a reservoir 5A, 5B of lubricating fluid H, may be used to supplement said main lubricating circuit 3, for example with a view to increasing the flow rate of lubricant and/or lubricating specific parts which are not lubricated very much, if at all, by said main circuit 3.

However, according to a preferred embodiment, it may also be used as a backup device, to lessen the effect of a failure or malfunction of said main circuit 3, particularly when there is a leak of lubricating fluid. In the latter instance, according to a preferred implementation, said device 1A, 1B, 1C is set in operation only when parameters, such as the temperature or pressure, measured using sensors which have not been depicted on said main circuit 3, cross predetermined thresholds.

According to the invention, the device 1A, 1B and 1C has, in particular, the following features:

the reservoir 5A, 5B is located beneath the part or parts of the assembly 2 that are to be lubricated so as to collect, by trickling, the lubricating fluid already used for lubricating this or these parts, for example the aforementioned part 6. Thus, in the case of a transmission gearbox, the reservoir 5A, 5B may be formed at the bottom of said transmission gearbox. However, it may also be formed beneath an intermediate level, for example beneath the stage relating to the epicyclic gear set or "epicyclic module" or, for example, as appropriate, under each of the two epicyclic stages of said transmission gearbox;

the distribution circuit 8 comprises at least one scoop 9 which is preferably produced in the form of a pipe, particularly a metal pipe, one end 9A of which enters said collection reservoir 5A, 5B;

the device 1A, 1B, 1C comprises means 10A, 10B, 10C for creating a relative movement between at least said end 9A of the scoop 9 and said collection reservoir 5A, 5B; and said relative movement is such that it causes, in the lubricating fluid H in the collection reservoir 5A, 5B, a force or a dynamic effect such that this effect causes the lubricating fluid H to enter said scoop 9 via said first end 9A (which is shaped and arranged accordingly, as will be seen hereinbelow) and causes it to circulate through said distribution circuit 8, as illustrated by arrows F.

Thus, by virtue of the invention, lubrication is achieved by re-using the oil or lubricating fluid H collected (by trickling) in said collection reservoir 5A, 5B. In consequence, in the event of a leak or loss of some of the oil, particularly from the main lubricating circuit 3, lubrication can be continued using the proportion of the remaining oil collected, which allows said step-up/down mechanical assembly 2 to be able to continue to operate for a certain length of time yet after the incident which caused the loss of oil.

In particular, in the case of a helicopter transmission gearbox, this length of time may be such that it allows the helicopter to land in complete safety at a safe place.

According to the invention, in order to extend this operating time, the lubricating device 1A, 1B, 1C is formed in such a way as to lubricate just one or several parts 11, 12, 13, for example gears, which are considered as being vital in the context of the present invention, that is to say parts which are necessary to the operation of the assembly 2 and which have to be lubricated in order to be able to continue to fulfill their functions correctly. Failing lubrication, the risk of wear and damage to these parts is very high.

This makes it possible to economize and to use the collected lubricating fluid in a targeted manner and thus increase the remaining running time of the assembly 2.

Furthermore, by virtue of the invention, the lubricating fluid H is made to circulate in said distribution circuit 8, as illustrated by arrows F, by the dynamic effect (or force) produced by the relative movement of the collection reservoir 5A, 5B and said first end 9A of the scoop 9. This dynamic effect makes it possible to overcome the pressure drops in the distribution circuit 8 and provide the necessary lubrication flow rate.

In consequence, the device 1A, 1B, 1C according to the invention requires no pump or other known means for causing this circulation, thus making it possible to obtain a lightweight, non-bulky and inexpensive device 1A, 1B, 1C.

In addition, the trickling of the lubricating fluid H along the walls of the assembly 2, which are generally cooler, makes it possible to remove, at least in part, the heat energy produced in said assembly 2, and thus fulfill the second aforementioned function (heat removal) of a lubricating device, in addition to providing the lubrication itself.

In the context of the present invention, the relative movement between the end 9A of the scoop 9 and the reservoir 5A, 5B, which is preferably a rotary movement so that the cooling fluid H is then subjected, in said reservoir 5A, 5B, both to a rotary movement and to a centrifugal force, which generate the aforementioned dynamic effect, may be obtained in various ways.

In a first embodiment depicted in FIGS. 1 and 4:
- the scoop 9 is fixed to the structure 2A, for example the casing, of the step-up/down mechanical assembly 2;
- the reservoir 5A is mounted in such a way that it can rotate about an axis of rotation X—X, for example the axis of symmetry of said assembly 2; and
- the means 10A, for example an electric motor, are formed in such a way as to rotate said reservoir 5A in the direction illustrated by an arrow S1.

It will be noted, in the context of the present invention, that the rotational drive may also be achieved by a power shaft 10C arranged, for example, on the rotor shaft, in the case of a helicopter main transmission gearbox, and which is also depicted, as a variant of the means 10A, in FIG. 4. This drive may also be performed by any other link to a moving part of the assembly 2.

To simplify the drawings, only the level Ha of the lubricating fluid H present in the reservoir 5A has been shown.

Furthermore, in a second embodiment depicted in FIG. 5:
- the reservoir 5B, which is produced in the form of an annular reservoir, is fixed to the structure 2B of the assembly 2, for example to the casing of a transmission gearbox. This reservoir 5B may also be incorporated into said structure 2B;
- the distribution circuit 8 comprises two scoops 9, which are joined together and which are mounted so that they can rotate about an axis Y—Y. Of course, in this embodiment, the distribution circuit 8 may also comprise a single scoop or more than two scoops; and
- the means 10B, for example an electric motor, are formed in such a way as to rotate said scoops 9 in the direction illustrated by an arrow S2. In one particular alternative variant, the means 10B may rotate the element 12 (pinion) which then transmits the rotational movement to said scoops 9. The drive may also be performed by a link to a moving part of the assembly 2, as mentioned earlier.

In this second embodiment, openings 15 are also envisaged, near the annular reservoir 5B, to allow excess lubricating fluid H to overflow, as illustrated by arrows G.

It will also be noted that, in the context of the present invention, all that is required is for the end 9A of the scoop 9 to be rotated. However, in a simplified and preferred embodiment, the entire distribution system 8 is rotated.

As indicated earlier, the scoop 9 is preferably produced in the form of a pipe, and its inlet end 9A is formed in such a way as to give the lubricating fluid H the best possible chance of entering said scoop 9.

To this end, said end may, for example, be inclined with respect to the body of the pipe. However, in a preferred and particularly effective embodiment, said end 9A is elbowed, in a region C, as illustrated in FIGS. 2 and 6, so that the free end 16, 17 of this elbow C lies in a plane which is orthogonal to the aforementioned axis of rotation X—X, Y—Y.

Figure 2:
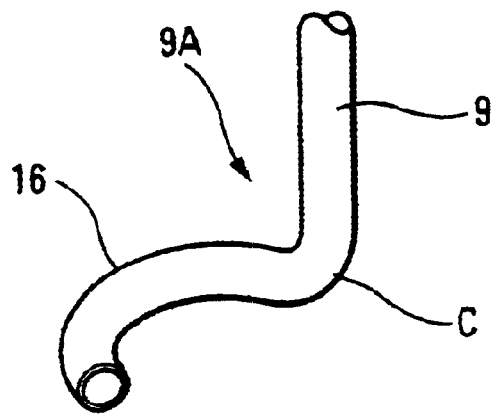
FIG. 2 shows, in perspective, the inlet end of a scoop according to a first embodiment of the invention.
Figure 3:
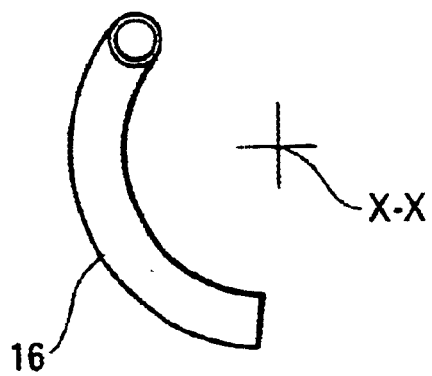
FIG. 3 is a view from above of the inlet end depicted in FIG. 2.

In a first alternative form depicted in FIGS. 2 and 3 and which is particularly well-suited to the embodiments of FIGS. 1 and 4, said free end 16 of the elbow C is roughly in the shape of an arc of a circle, the center of which roughly corresponds to the said axis of rotation X—X, which makes it easier for the lubricating fluid H to enter the scoop 9 and circulate therein because, as mentioned earlier, said lubricating fluid H is subjected to a rotary movement which is created, in addition to the centrifugal force, by the rotating of the reservoir 5A.

Figure 6:
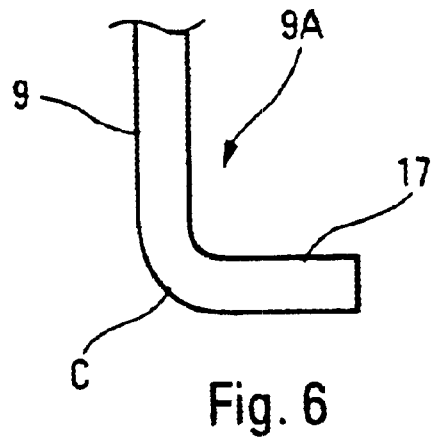
FIG. 6 shows a second embodiment of the inlet end of a scoop according to the invention.

In a simplified second alternative form depicted in FIG. 6 and which can be applied, for example, to the embodiment of FIG. 5, said free end 17 of the elbow is roughly straight.

To improve the entry of the lubricating fluid H into the scoop 9 and its circulation therein, and thus improve the effectiveness of the device 1A, 1B according to the invention, means 18 intended to reduce, in the reservoir 5A, the turbulence of the lubricating fluid H which is generated by the aforementioned relative movement, are provided in said reservoir 5A.

In the embodiments depicted in FIGS. 1 and 4, said means 18 are produced in the form of fins, which are stationary, and the free ends of which are shaped appropriately. Other alternative forms are of course also possible for obtaining the same result.

In another embodiment which applies, for example, to the device 1C of FIG. 5, said means may comprise cavities 22 of appropriate shapes, provided in the reservoir 5B. These cavities 22 are intended to reduce the rotational speed of the lubricating fluid H, particularly with respect to the speed at which the scoops 9, driven by the means 10B, rotate.

Furthermore, the outlet end or ends 9B of each scoop 9 may be produced and arranged in various ways.

Firstly, as depicted in FIGS. 1 and 5, said end 9B may be located facing the element 11, 12, 13 that is to be lubricated, so as to lubricate said element 11, 12, 13 directly. For this purpose, said end 9B may be shaped accordingly or fitted with a nozzle 19 of the conventional type.

Secondly, as depicted in FIG. 4, this end 9B may be arranged in such a way as to supply an additional reservoir 20 with lubricating fluid H.

In a first alternative form depicted in said FIG. 4, said additional reservoir 20 is arranged above an element 11 that is to be lubricated and at its bottom has a discharge pipe 21. Thus, the lubricating fluid H collected can be used to lubricate, immediately or later, under the effect of gravity via said discharge pipe 21, said element 11 of the assembly 2.

In a second alternative form which has not been depicted, said additional reservoir which is preferably produced in the form of an annular reservoir:
- is mounted so that it can rotate;
- is positioned facing one or more parts that are to be lubricated, for example the teeth of a planet pinion;
- comprises at least one opening facing this/these part(s) that is/are to be lubricated; and
- is rotated by known means, for example one of the aforementioned means 10A, 10B or a driven power shaft, so as to cause lubricating oil to reach this/these appropriately arranged parts by a centrifugal effect and thus lubricate it/them.

It will be noted that this second alternative form is particularly well-suited to embodiment 1C [mobile scoop(s) and stationary reservoir 5B], the end 9B of the scoop then being modified accordingly, preferably being fixed to said auxiliary reservoir.

As mentioned earlier, in the context of the present invention:

the distribution circuit 8 may have one or more scoops 9 and, in particular, a number of scoops of different types, such as those of FIGS. 1 and 4 for example; and each scoop 9 may have one or more outlet ends 9B.

What is claimed is:

1. A device for lubricating a step-up/down mechanical assembly with a lubricating fluid, said lubricating device comprising:

a collection reservoir for collecting the lubricating fluid from said step-up/down mechanical assembly, said collection reservoir being fixed to a structure of said step-up/down mechanical assembly;

a circuit for distributing lubricating fluid, said circuit comprising at least one scoop, wherein said scoop has a first end which enters said collection reservoir and which is mounted to rotate with respect to said structure of said step-up/down mechanical assembly; and means for creating a relative movement between at least said first end of the scoop and said collection reservoir, the relative movement causing said lubricating fluid in said collection reservoir to flow through said distribution circuit and to be conveyed to at least one element of said step-up/down assembly that is to be lubricated, and wherein said means for creating said relative movement comprise means for causing said first end of said scoop to rotate about an axis of rotation with respect to said structure of said step-up/down mechanical assembly, wherein said collection reservoir is located beneath said at lest one element to be lubricated, and said scoop is oriented parallel to the axis of rotation.

2. The device as claimed in claim 1, wherein said step-up/down mechanical assembly is a transmission gearbox.

3. The device as claimed in claim 1, wherein said first end of the scoop comprises an elbow and a free end, the free end being (1) located in a plane orthogonal to said axis of rotation.

4. The device as claimed in claim 3, wherein said free end of said elbow is substantially straight.

5. The device as claimed in claim 1, wherein said scoop has a second end which is opposite to said first end and which is located facing one element of said step-up/down mechanical assembly that is to be lubricated.

6. The device as claimed in claim 1, wherein said scoop has a second end which is opposite to said first end and which is fitted with a nozzle.

7. The device of claim 1, wherein said means for creating a relative movement rotates said element that is to be lubricated, which then transmits the rotational movement to said scoop.

8. The device of claim 1, wherein the lubricating device includes openings, near said collection reservoir, to allow excess lubricating fluid to overflow.

9. The device of claim 1, further comprising cavities, located in said collection reservoir, for reducing the rotational speed of the lubricating fluid.

* * * * *